(No Model.)

O. J. KOSIOL.
SCREW CUTTING DIE.

No. 297,941. Patented Apr. 29, 1884.

WITNESSES
Phil C. Dietrich.
W. R. Keyworth.

INVENTOR
Oswald J. Kosiol
by
W. H. Alexander
Attorney

UNITED STATES PATENT OFFICE.

OSWALD J. KOSIOL, OF LOUISVILLE, KENTUCKY.

SCREW-CUTTING DIE.

SPECIFICATION forming part of Letters Patent No. 297,941, dated April 29, 1884.

Application filed November 30, 1883. (No model.)

*To all whom it may concern:*

Be it known that I, OSWALD J. KOSIOL, of Louisville, in the county of Jefferson and State of Kentucky, have invented certain new and useful Improvements in Lathe-Dies; and I do hereby declare that the following is a full, clear, and exact description thereof, reference being had to the accompanying drawings, and to the letters of reference marked thereon, which form part of this specification.

This invention relates to certain improvements in dies for cutting the threads of male screws; and it has for its objects to provide a device that may be fitted to a lathe-chuck or hand-chuck, as may be found convenient, and in which the cutting parts will have a wide range of adjustment, and which may be readily removed and sharpened as required. These objects are attained by the means illustrated in the accompanying drawings, in which—

Figure 1:
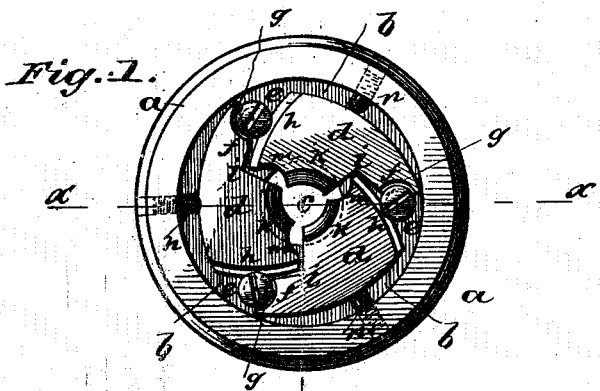
Figure 2:
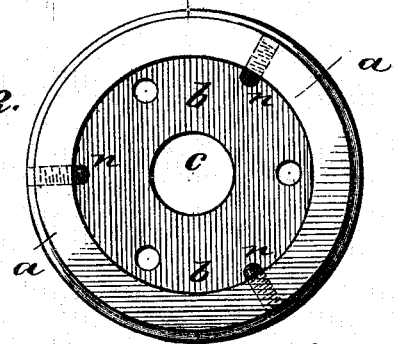
Figure 3:
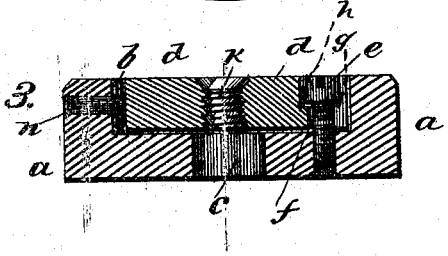
Figure 4:
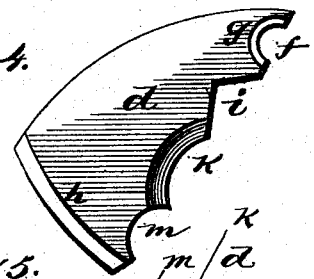
Figure 5:

Figure 1 represents a plan view of the die complete. Fig. 2 is a similar view with the dogs removed. Fig. 3 is a central vertical section on the line $x\,x$, Fig. 1; and Figs. 4 and 5 are enlarged plan and edge views, respectively, of one of the dogs.

The letter $a$ indicates a circular metallic disk or head, which is provided with a circular recess, $b$, and a central aperture, $c$.

Within the circular recess are located the thread-cutters $d$, being held therein by the screws $e$, as more fully hereinafter specified. Three of said cutters are employed in the present instance, each consisting of a steel dog or die. The said dogs or dies are provided with semicircular seats or recesses $f$, having shoulders $g$, against which the heads of the screws abut to hold the said dogs or dies in the recess at one end, the other ends of said dogs or dies being curved, and formed with shoulders $h$, which are on a line with the shoulders in the recesses $f$, as shown. The heads of the screws $e$ also abut against these shoulders $h$, thus holding the dogs or dies securely in the recess $b$ at both ends. The said dies are provided on their inner sides with recesses $i$, the curved ends of the dies being adapted to move in such recesses to and from the center of the disk or head $a$ in adjusting the dogs or dies $d$ to cut the threads of screws of different diameters.

The letter $k$ indicates the thread cutting and forming portions of the dogs or dies, which are located on the inner sides of the same immediately around the center of the device, so as to automatically center the screw-blank while being threaded. The said cutting portions are in the form of an arc of a circle, threaded as shown, the threads being of the proper pitch to form the desired threads on the screw-blank. At the forward ends of the dogs or dies are formed semi-cylindrical recesses $m$, forming sharp cutting-points at the ends of the threads, and passages for the escape of cuttings.

The letter $n$ indicates a series of adjusting-screws, which are located in threaded recesses in the rim of the disk or head, in such position that their inner ends may be adjusted to bear upon the outer sides of the dogs or dies, and hold the same at different distances from the center of the disk or head, to adjust the device to cut screws of different diameters, as will be readily understood by any one familiar with the use of tools.

The screws $e$, it will be perceived, besides serving, in connection with the adjusting-screws, to hold the dogs or dies in position, may be readily removed, so that the said dogs or dies may be taken out for the purpose of sharpening the cutting portions whenever required.

The disk or head may be secured to a lathe chuck or stock in any desired manner, and is operated in the same manner as the ordinary cutting-dies.

Having thus described my invention, what I claim, and desire to secure by Letters Patent, is—

1. A die for cutting screw-threads, consisting of a disk or head having a circular recess and a central aperture, a series of cutting dogs or dies, recessed and shouldered at one end and shouldered at the other, and a series of screws having their heads abutting against said shoulders, whereby the dogs or dies are removably and adjustably confined in the head, substantially as specified.

2. The combination, with the recessed head having a central aperture and a series of adjustable cutting dies or dogs, of the confining-screws, whereby the dogs or dies are held in place, and the adjusting-screws, whereby the said dogs or dies are adjusted centrally, substantially as and for the purpose specified.

3. The combination, with the recessed head provided with a central aperture, of the cutting dogs or dies, shouldered as described, and provided with recesses $i$, the confining-screws, and the adjusting-screws, all adapted to operate substantially in the manner specified.

In testimony that I claim the foregoing as my own I affix my signature in presence of two witnesses.

OSWALD J. KOSIOL.

Witnesses:
GEO. E. PARKER,
LOUIS KOSIOL.